No. 770,358. PATENTED SEPT. 20, 1904.
P. FIGUCCIA.
CELL FOR STORAGE BATTERIES.
APPLICATION FILED FEB. 19, 1904.
NO MODEL.
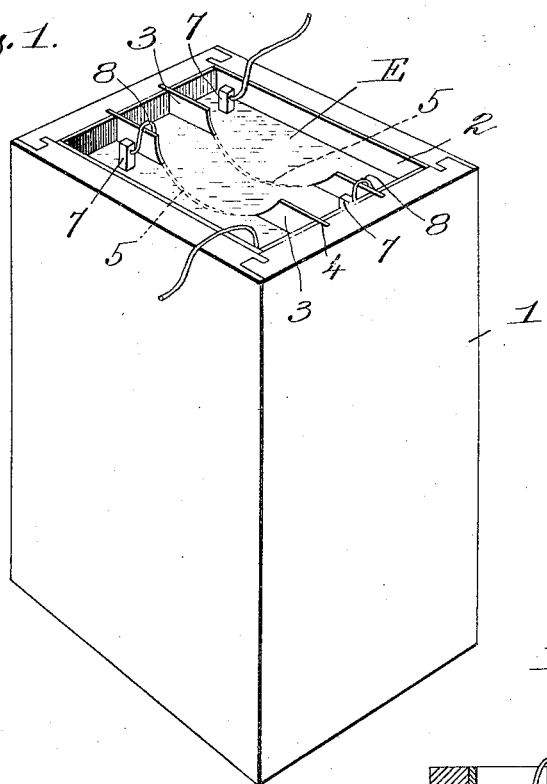
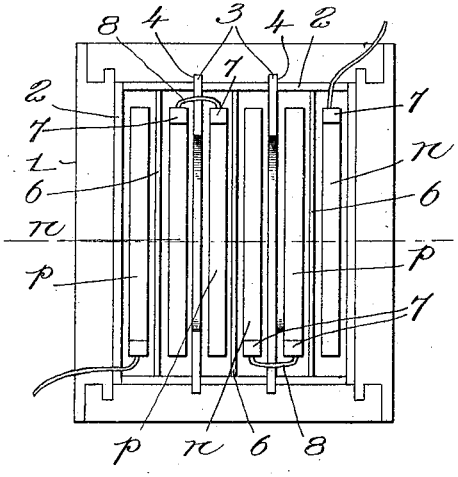
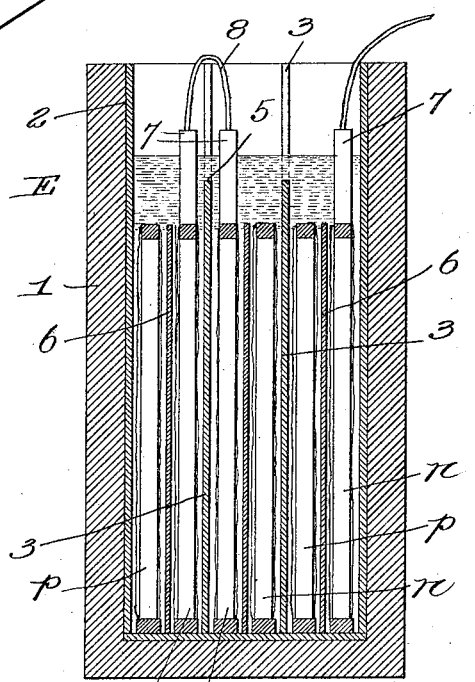
Witnesses:
Wm. J. Drummond.
Fred S. Greenleaf.
Inventor:
Pietro Figuccia,
by Crosby Gregory
Attys.

No. 770,358.

Patented September 20, 1904.

UNITED STATES PATENT OFFICE.

PIETRO FIGUCCIA, OF BOSTON, MASSACHUSETTS, ASSIGNOR OF ONE-HALF TO LOUIS M. ROSSI, OF BOSTON, MASSACHUSETTS.

CELL FOR STORAGE BATTERIES.

SPECIFICATION forming part of Letters Patent No. 770,358, dated September 20, 1904.

Application filed February 19, 1904. Serial No. 194,398. (No model.)

*To all whom it may concern:*

Be it known that I, PIETRO FIGUCCIA, a subject of the King of Italy, and a resident of Boston, county of Suffolk, State of Massachusetts, have invented an Improvement in Cells for Storage Batteries, of which the following description, in connection with the accompanying drawings, is a specification, like characters on the drawings representing like parts.

This invention relates to storage batteries and accumulators; and it has for its object the production of an improved cell for use in connection therewith whereby certain highly-advantageous features of construction and operation are secured.

In the use of metallic grids on which is supported the active material in the form of a paste considerable trouble is now experienced by short-circuiting, due to the separation of the paste from the grid and falling to the bottom of the cell, a number of sets of the grids being inserted in the cell. Thus if paste falls from any grid to the bottom of the cell a short circuit is established if it comes in contact with the electrode of opposite polarity and the efficiency of the whole cell is greatly reduced. In my present invention I have overcome this objection by dividing the cell by means of partitions of non-conducting material into a plurality of separate compartments, a positive and a negative electrode being located in each, means being provided for the proper communication of the electrolyte between the different compartments. Should any of the active material in a compartment fall to the bottom and form a short circuit, the efficiency of that compartment only will be affected, with no effect on the other compartments of the cell. Inasmuch as the electrolyte is in communication with the different compartments, the entire cell acts with a unitary effect.

I am enabled by the construction of my novel cell to reduce the weight and volume of the cell structure and increase the efficiency.

With a number of separate cells of usual construction the voltage descends very rapidly and the descent is not synchronous—*i. e.*, the separate cells vary in efficiency and seldom, if ever, possess the same degree of excellence.

By using a multicompartment cell in accordance with my invention, thereby providing a plurality of groups of positive and negative electrodes in the different compartments of the cell with a common electrolyte, I provide for a very uniform action of each group, obviate any widespread disturbance due to improper contact of positive and negative elements due to fallen paste or imperfect separation, and greatly increase the total voltage of the cell. As a matter of fact the voltage of such a cell is larger than if each group be located in a separate and independent cell and it is sustained for a longer time.

Figure 1 is a perspective view of a cell embodying one form of my invention. Fig. 2 is a top or plan view thereof; and Fig. 3 is a transverse section of the cell on the line 3 3, Fig. 2.

The cell 1, shown as rectangular in shape, is made of any suitable material, such as wood, with a lining 2 of material unaffected by the electrolyte, such as rubber, ebonite, glass, &c. A plurality of compartments are formed in the cell by one or more upright partitions 3, of non-conducting material, the lower edges of the partitions extending down to the bottom of the cell, as shown in Fig. 3. I have shown two such partitions dividing the cell into three separate compartments; but the number of compartments may be varied in accordance with the size of cell, thickness of the electrodes, &c. The partitions 3 are held in upright position parallel to each other by convenient means, as by passing their side edges through upright slots in the lining 2 and into grooves 4 in the outside sheath 1. Instead of such means the walls of the cell may be grooved and the partitions pushed down into place. Usually the side joints are made water-tight; but if desired to increase the permeability of the electrolyte between different compartments the partitions may be loosely held at their sides or they may be made of porous material.

In order to provide for free communication of the electrolyte in the different compartments, I have shown the partitions 3 cut away at their upper ends, as at 5, below the level of the electrolyte E, Figs. 1 and 3.

Within each compartment a positive electrode $p$ and a negative electrode $n$ are inserted, each electrode consisting of a grid, of lead or other conducting material, carrying the active element in the form of paste.

The electrodes may be of any suitable construction—such, for instance, as shown in my United States Patent No. 726,274—and a flat separator 6, of thin wood or other suitable non-conductor, is interposed between the adcent faces of each pair and is supported by the bottom of the compartment.

By reference to Fig. 3 it will be seen that the pair of elements in each compartment is independent of the other elements in the cell, and should any paste fall it would be confined to its own compartment and could not affect the action in any other compartment.

The grids are provided with suitable extensions 7, to which conducting wires or strips 8 are attached, whereby a positive electrode in one compartment is electrically connected with the negative electrode in the next compartment, the extensions projecting well above the level of the electrolyte.

For various industrial or private uses where it is requisite to store electricity on a small scale—such as for igniters employed in gasolene automobile vehicles, electroplating-work, or for spark-producing or occasional illumination purposes—my improved cell is of great advantage, owing to its compactness, relatively small volume and weight, and its comparative cheapness. It is also very valuable in cases where inexperience or lack of electrical knowledge might otherwise serve as a drawback or hindrance to the use of electricity.

For scientific and medical purposes generally my improved cell is convenient, simple, and safe to handle and readily portable.

It will be obvious that the cells may be made large or small, according to the required power, and few or many groups of electrodes may be provided in a single cell, according to circumstances.

The separators act to retain the active material of the grids in place when such material swells, and it will be manifest from the foregoing description and the drawings that a separator or either or both of the electrodes with which it coöperates can be readily lifted out from the top of the compartment or inserted therein without disturbing the adjacent parts.

Having fully described my invention, what I claim as new, and desire to secure by Letters Patent, is—

1. In a battery-cell of the class described, one or more parallel and non-conducting and parallel partitions rigidly secured in place and in contact with the cell at their upright and bottom edges, to divide the cell into a plurality of compartments, the upper end of each partition being cut down between its side edges to form a passage-way for the electrolyte, a positive and negative electrode located in each compartment, the positive electrode of one compartment being electrically connected with the negative electrode of the next compartment, and a separator interposed between each pair of electrodes and supported in the compartment at its lower edge, whereby the separator may be removed or inserted without disturbance of the electrodes.

2. In a battery-cell of the class described, one or more upright, parallel partitions of non-conducting material dividing the cell into a plurality of electrode-receiving compartments, the side edges of said partitions extending substantially to the top of the cell, and the upper end of each partition being cut away between its side edges to a point below the level of the electrolyte, and the lower end of each partition extending to the bottom of the cell, and an independently-removable, thin flat separator in each compartment.

3. A battery-cell having one or more partitions of non-conducting material extending from side to side of the cell and down to the bottom thereof, to divide the cell into a plurality of compartments, a positive and a negative electrode in each compartment, a freely-removable separator between each pair of such electrodes, and means to connect the positive electrode of one compartment with the negative electrode in the next compartment, the electrolyte being permitted to pass from one compartment to another.

In testimony whereof I have signed my name to this specification in the presence of two subscribing witnesses.

PIETRO FIGUCCIA.

Witnesses:
JOHN C. EDWARDS,
ELIZABETH R. MORRISON.